(12) United States Patent
Nagamasa

(10) Patent No.: US 7,359,798 B2
(45) Date of Patent: Apr. 15, 2008

(54) METHOD OF CONTROLLING DISPLAY OF POINT INFORMATION ON MAP

(75) Inventor: Yoshinobu Nagamasa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 806 days.

(21) Appl. No.: 10/776,167

(22) Filed: Feb. 12, 2004

(65) Prior Publication Data
US 2004/0162669 A1   Aug. 19, 2004

(51) Int. Cl.
*G01C 21/30* (2006.01)
*G01C 21/32* (2006.01)

(52) U.S. Cl. .................. 701/208; 340/995.1; 340/990; 701/207; 701/212; 707/3; 707/5; 707/200

(58) Field of Classification Search ............... 701/208, 701/207, 212; 340/995.1, 990; 707/3, 5, 707/200
See application file for complete search history.

(56) References Cited

U.S. PATENT DOCUMENTS

| 4,097,134 | A | * | 6/1978 | Jerie | 353/11 |
| 4,870,576 | A | * | 9/1989 | Tornetta | 705/1 |
| 4,972,319 | A | * | 11/1990 | Delorme | 340/990 |
| 6,266,085 | B1 | * | 7/2001 | Kato et al. | 348/211.7 |
| 6,397,208 | B1 | * | 5/2002 | Lee | 707/3 |
| 6,408,307 | B1 | * | 6/2002 | Semple et al. | 707/104.1 |
| 6,415,291 | B2 | * | 7/2002 | Bouve et al. | 707/10 |
| 7,054,741 | B2 | * | 5/2006 | Harrison et al. | 701/208 |
| 7,171,389 | B2 | * | 1/2007 | Harrison | 705/51 |
| 2004/0162669 | A1 | * | 8/2004 | Nagamasa | 701/208 |
| 2006/0289752 | A1 | * | 12/2006 | Fukunishi et al. | 250/310 |

FOREIGN PATENT DOCUMENTS

| DE | 69027843 E | * | 8/1996 |
| JP | 11065430 A | * | 3/1999 |
| JP | 11-114629 |   | 4/1999 |
| JP | 3516120 B2 | * | 4/2004 |
| JP | 2004272217 A | * | 9/2004 |
| JP | 2005277705 A | * | 10/2005 |

OTHER PUBLICATIONS

High-Performance Direct Pairwise Comparison of Large Genomic Sequences, Mueller, C.; Dalkilic, M.M.; Lumsdaine, A.; Parallel and Distributed Systems, IEEE Transactions on vol. 17, Issue 8, Aug. 2006 pp. 764-772, Digital Object Identifier 10.1109/TPDS. 2006.104.*
Rover: scalable location-aware computing, Banerjee, S.; Agarwal, S.; Kamel, K.; Kochut, A.; Kommareddy, C.; Nadeem, T.; Thakkar, P.; Bao Trinh; Youssef, A.; Youssef, M.; Larsen, R.L.; Udaya Shankar, A.; Agrawala, A.; Computer, vol. 35, Issue 10, Oct. 2002 pp. 46-53, Digital Object Identifier 10.1109/MC.2002.1039517.*

(Continued)

*Primary Examiner*—Cuong Nguyen
(74) *Attorney, Agent, or Firm*—Fitzpatrick, Cella, Harper & Scinto

(57) ABSTRACT

A map of a zoom area to be zoomed is displayed within a display screen while point information excluded from the zoom area is displayed in a position for indicating a direction thereof in a periphery of the map of the zoom area.

14 Claims, 10 Drawing Sheets

OTHER PUBLICATIONS

SH-60B HUMS experience using a satellite data link, Friend, S.; Monopoli, D.; Natoli, L.; Haas, D.J.; Aerospace, 2005 IEEE Conference, Mar. 5-12, 2005 pp. 3445-3453, Digital Object Identifier 10.1109/AERO.2005.1559647.*

The design of next generation SCADA systems, Duong Trung; Power Industry Computer Application Conference, 1995. Conference Proceedings., 1995 IEEE May 7-12, 1995 pp. 431-436, Digital Object Identifier 10.1109/PICA.1995.515274.*

High-performance direct pairwise comparison of large genomic sequences, Mueller, C.; Dalkilic, M.; Lumsdaine, A.; Parallel and Distributed Processing Symposium, 2005. Proceedings. 19th IEEE International, Apr. 4-8, 2005 p. 8 pp., Digital Object Identifier 10.1109/IPDPS.2005.246.*

ASAP: A Synchronous Approach for Photo Sharing across Multiple Devices, Zhigang Hua; Xing Xie; Hanqing Lu; Wei-Ying Ma; Multimedia Modelling Conference, 2005. MMM 2005. Proceedings of the 11th International, Jan. 12-14, 2005 pp. 206-213 Digital Object Identifier 10.1109/MMMC.2005.21.*

IEEE standard criteria for security systems for nuclear power generating stations, Oct. 3, 1997.*

Design of a wireless assisted pedestrian dead reckoning system—the NavMote experienceLei Fang; Antsaklis, P.J.; Montestruque, L.A.; McMickell, M.B.; Lemmon, M.; Yashan Sun; Hui Fang; Koutroulis, I.; Haenggi, M.; Min Xie; Xiaojuan Xie; Instrumentation and Measurement, IEEE Transactions on, vol. 54, Issue 6, Dec. 2005 pp. 2342-2358.*

* cited by examiner

ZOOM PROCESS AREA

METHOD OF CONTROLLING DISPLAY OF POINT INFORMATION ON MAP

BACKGROUND OF THE INVENTION

1. Field of the Invention

The present invention relates to a method of controlling display of point information when a stored map is partially zoomed.

2. Related Background Art

Up to now, there are known personal computers, portable information terminals, car navigation systems, etc. that can display a map of an arbitrary area on a screen of a display device based on map data stored in a server on a network in advance.

In order to provide a user with information that is more appropriate and further detailed, those apparatuses enable the user to zoom in or out to display a specific area on a displayed map at a predetermined magnification.

However, in the case of zoom display of the specific area on the currently-displayed map, only the map of the specific area that has been zoomed is displayed. Naturally, a map and point information of a vicinity area outside the specific area are no longer displayed.

That is, in the case where the map and the point information that were included in the vicinity area before a zoom process are to be viewed while the zoomed map is being displayed, it is necessary to restore at least a primary map. Thus, it is impossible to view the zoomed map of the specific area simultaneously while checking its positional relationship with map information of the vicinity area.

Known as a method for solving such a problem is a method of displaying a plurality of maps in different scales are simultaneously displayed on a screen such that a positional relationship can be grasped with respect to a vicinity area. However, the method that utilizes a divided screen has an inconvenience in that each area of the displayed map is small.

SUMMARY OF THE INVENTION

The present invention therefore has an object to provide a method for solving the above-mentioned problem.

In order to achieve the above-mentioned object, according to an embodiment of the present invention, a map of a zoom area to be zoomed is displayed within a display screen while point information excluded from the zoom area is displayed in a position for indicating a direction thereof in a periphery of the map of the zoom area.

Other objects and features of the present invention will become apparent upon reading the following description with reference to the drawings.

DESCRIPTION OF THE PREFERRED EMBODIMENTS

Hereinafter, detailed description will be made of embodiments of the present invention with reference to the drawings.

First Embodiment

Figure 1:
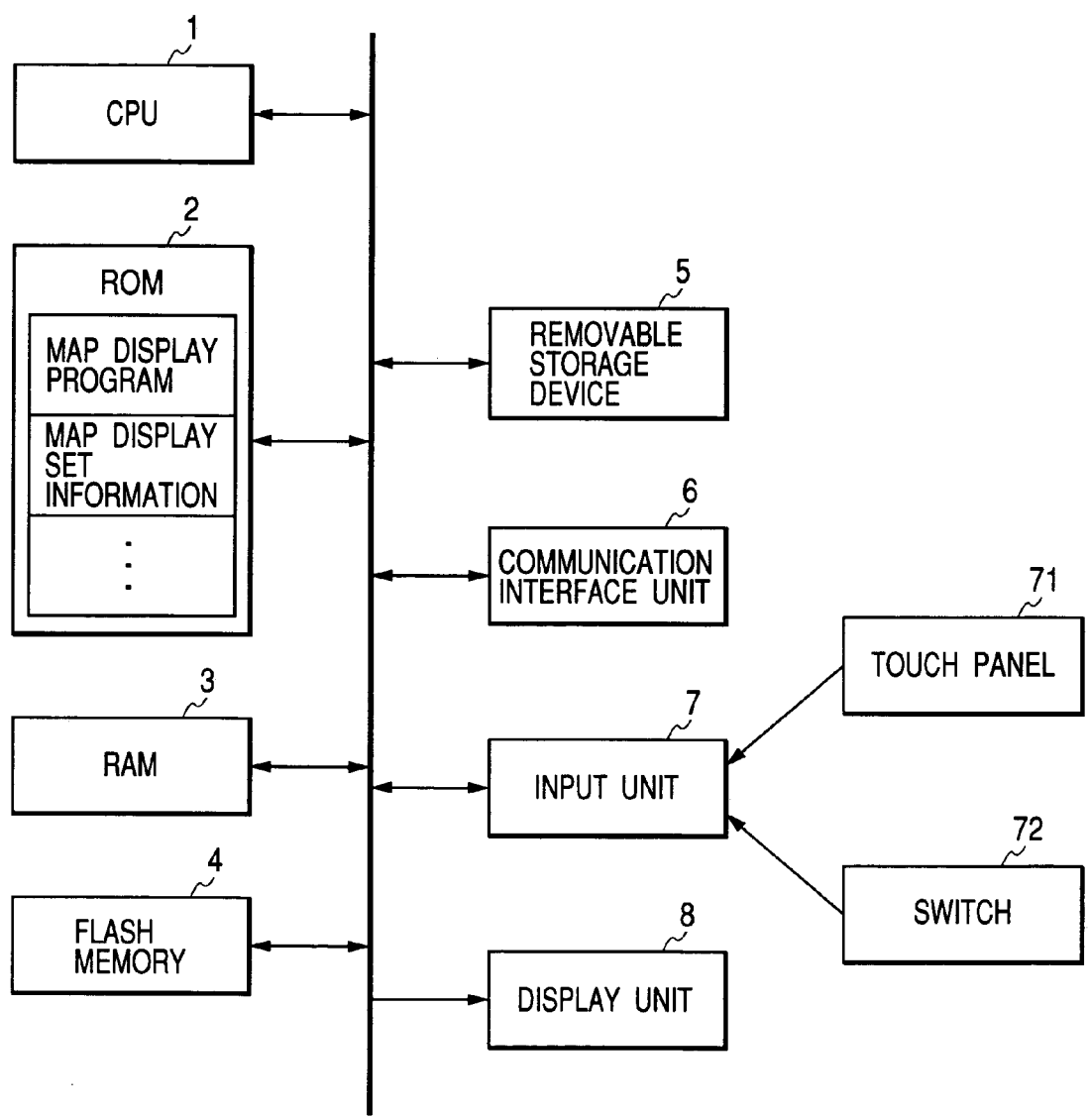
FIG. 1 is a block diagram showing electronic equipment according to a first embodiment of the present invention.

FIG. 1 shows a first embodiment of the present invention, which is an example of electronic equipment. The electronic equipment includes a CPU 1, a ROM 2, a RAM 3, a flash memory 4, a removable storage device 5, a communication interface unit 6, an input unit 7, and a display unit 8, which are connected to one another through a bus.

The ROM 2 stores a map display control program and a control program. The CPU 1 controls each unit according to the control program stored in the ROM 2. Also, the CPU 1 performs control according to the map display control program to retrieve a map and point information from a map information database included in the removable storage device 5, expand the map and the point information into the RAM 3 as display data, and display the display data on a screen of the display unit 8. On the other hand, in the case where the map information database is not included in the removable storage device 5 and exists in an external storage device, the CPU 1 performs control to retrieve a map and point information therefrom through the communication interface unit 6. Further, the CPU 1 executes an instruction inputted by a user by means of the input unit 7.

The RAM 3, that is an SDRAM here, is used by the CPU 1 as its work area. The flash memory 4 stores a program and various set information, such as landmark data, which can be changed by the user. The removable storage device 5, which is a memory card here, can be optionally removed and includes the map information database. The communication interface unit 6 is connected to communication equipment, such as a mobile phone, a modem, a LAN, and a wireless device, for input/output of data. The screen of the display unit 8 is provided with a touch panel 71.

The input unit 7 accepts instructions from the touch panel 71 and a switch 72.

Figure 2:
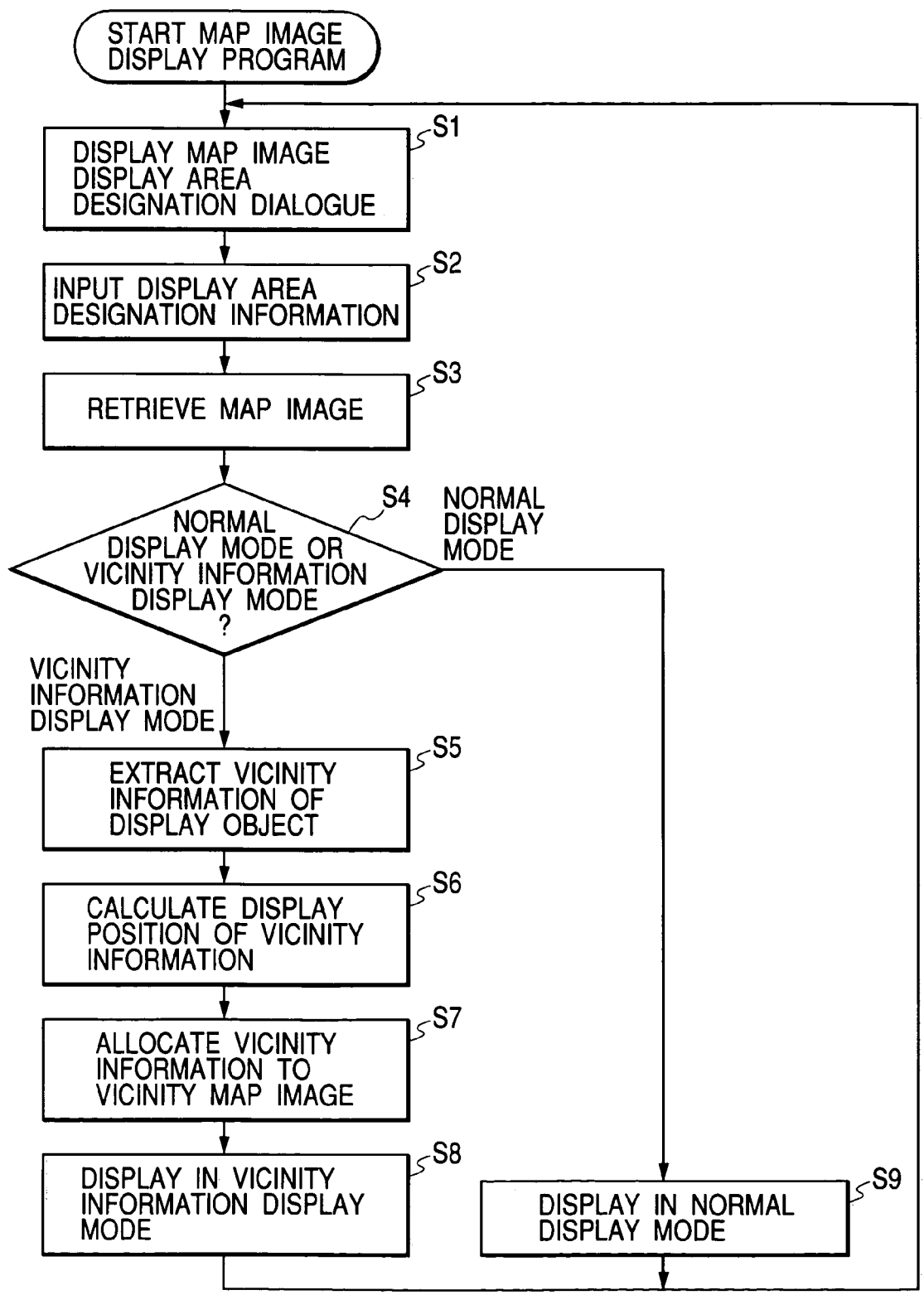
FIG. 2 is a flow chart showing an example of a map display control program that is stored in a ROM 2 of FIG. 1.

FIG. 2 is a flow chart showing an example of a map display control program that is stored in the ROM 2 of FIG.

Figure 3:
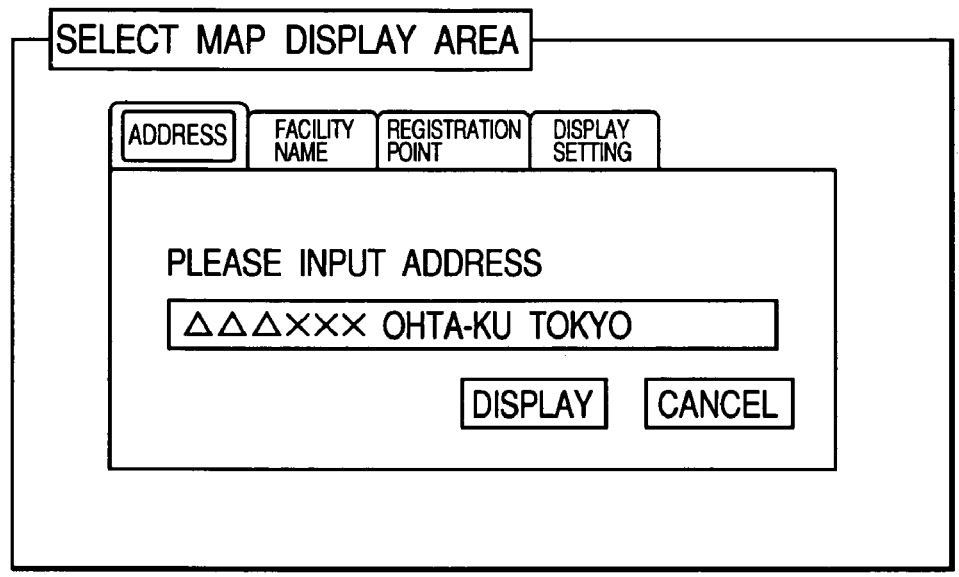
FIG. 3 is a diagram showing an example of a map display area designation dialogue.

1. Upon start of execution of the map display control program, a map display area designation dialogue shown in FIG. 3 is first displayed (step S1). Then, a place name, an address, and a proper name for a location (such as a building name) are inputted as display area designation information by the user using the touch panel 71, and detection is performed on selection of a "DISPLAY" button within the map display area designation dialogue (step S2). When the selection of a "DISPLAY" button is detected, based on the inputted information, a search is performed on the map information database included in the removable storage device 5. Upon completion of the search, a map is retrieved therefrom in a scale based on the set information that is previously registered in the flash memory 4 (step S3).

It is next checked whether a display mode is set to a normal display mode or a vicinity information display mode (step S4). According to the designated display mode found in step S4, the map is expanded into the RAM 3 as the display data, and displayed in the display unit 8 based on the expanded display data. In addition, point information (information relating to a facility) associated with a point included in the map displayed on the screen of the display unit 8 is superposed on the map (steps S8 and S9). The point information includes an intersection name, a station name, a picture (an icon) representing a facility such as a city hall, a police station, or a hospital, and a facility name thereof.

In order to change the display area of the map, it is necessary in step S1 to press the switch 72 to reactivate the map display area designation dialogue.

Figure 4:
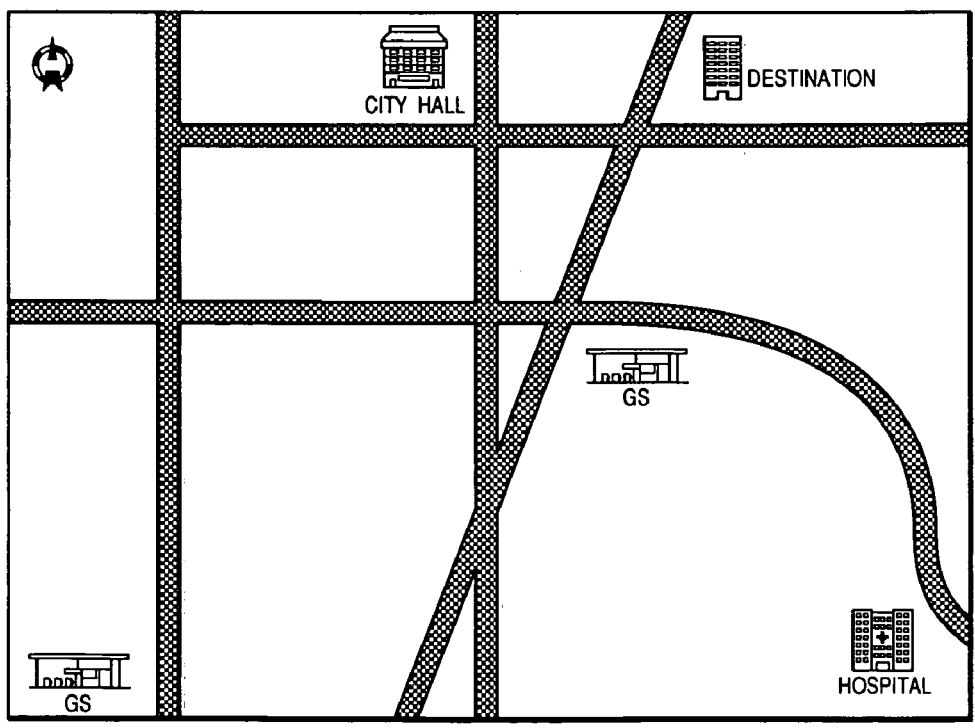
FIG. 4 is a diagram showing an example of a map displayed in a normal display mode.

Next, detailed description will be made of operations and differences between the normal display mode and the vicinity information display mode. The normal display mode is a mode for displaying such a map as shown in FIG. 4 in a similar manner to the conventional art, in which point information associated with a point included in the map is displayed by being superposed on the map.

Figure 7:
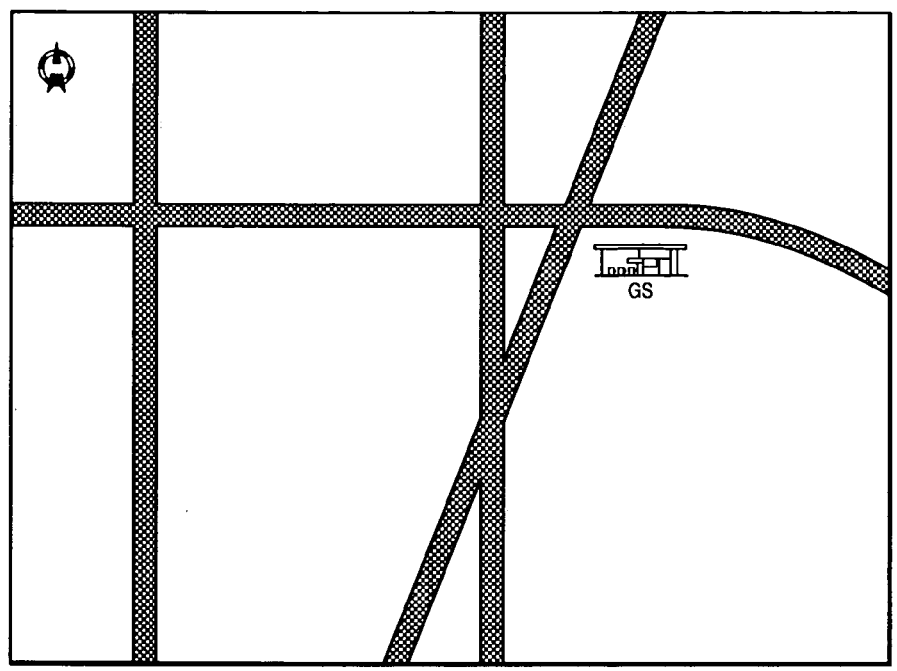
FIG. 7 is a diagram showing an example of the zoomed map displayed in the normal display mode.

In the normal display mode, when the switch 72 is pressed by the user and the touch panel 71 is operated such that two points are designated, the CPU 1 moves a rectangle area, which has a line segment between the designated two points as its diagonal line, to a center of the map to display a map included in the rectangle area at a predetermined magnification. Used as the magnification is one that is previously registered in the flash memory 4 by the user. In the case where the map is zoomed in (has a smaller scale), for example, in the case where a map shown in FIG. 5 is displayed by being zoomed into the entire screen of the display unit 8 as shown in FIG. 7, some pieces of the point information that have been displayed within the screen of the display unit 8 in FIG. 4 become outside the screen and may not be displayed.

On the other hand, in the vicinity information display mode, when the switch 72 is pressed by the user and the touch panel 71 is operated such that two points are designated, the CPU 1 moves a rectangle area, which has a line segment between the designated two points as its diagonal line, (hereinafter, referred to as "zoom process area") to a center of the screen of the display unit 8 to display a map of the zoom process area. Then, separately retrieved from the map information database are: image data of a partial map corresponding to the map of a zoom area; point information (information relating to a facility existing at each point) associated with points included in the partial map; and point information associated with points included in the map of FIG. 5 and excluded from the partial map. Specifically, an identifier indicating whether or not a point is in a position in the zoom area is added to each piece of the point information retrieved from the database.

The partial map is then displayed within a display screen based on the image data of the retrieved partial map, and information relating to a facility associated with a given point included in the partial map is displayed by being superposed on the partial map. Arranged in a periphery of the partial map for display is the point information associated with the points included in the map previously shown as in FIG. 5 and excluded from the area of the partial map (steps S5 to S7).

Figure 5:
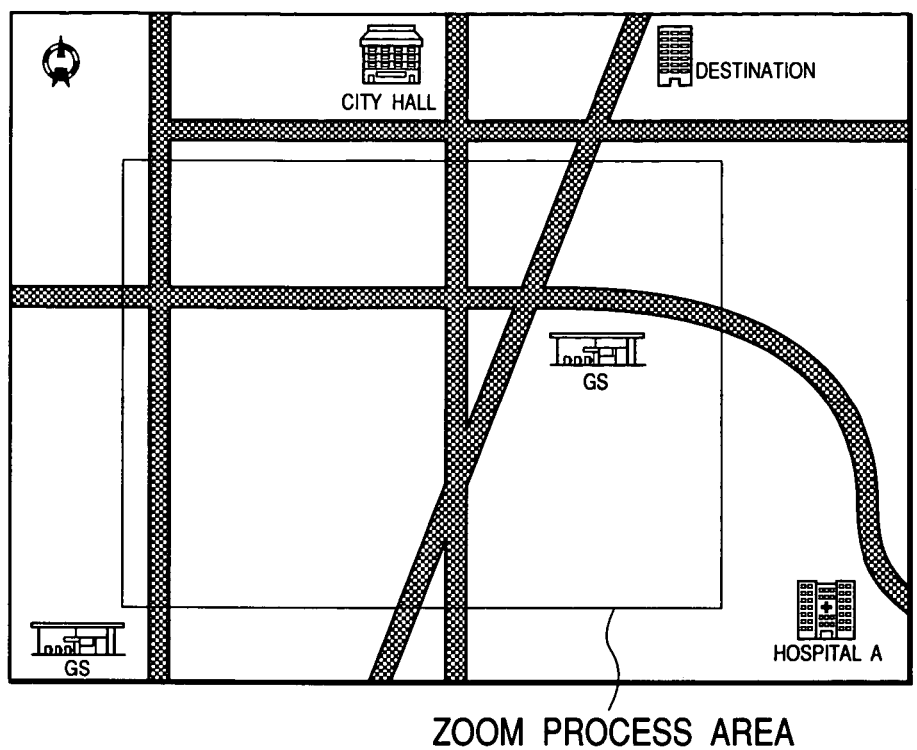
FIG. 5 is a diagram for explaining how to designate a zoom area.
Figure 6:
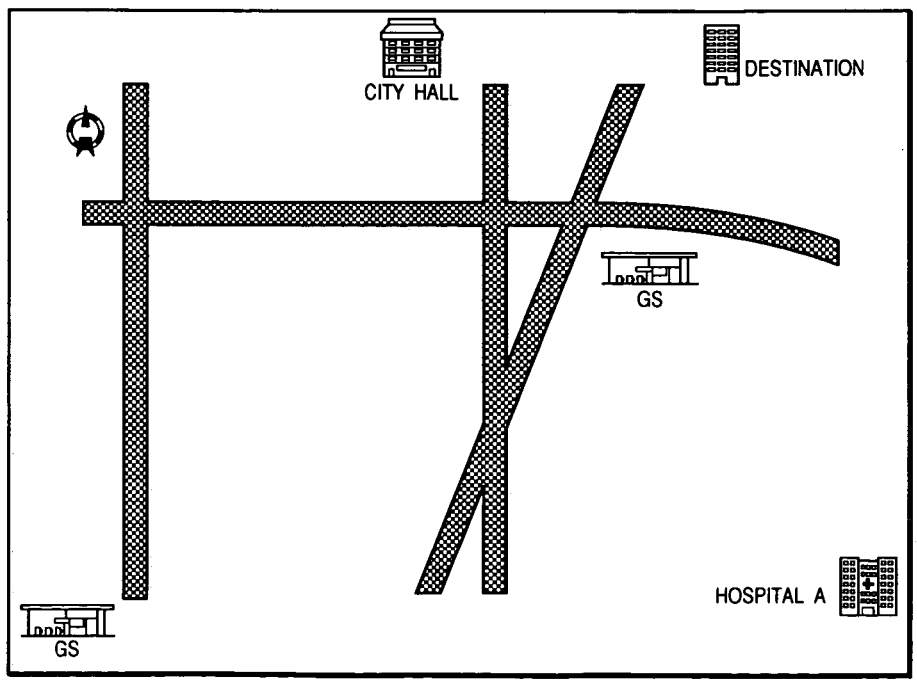
FIG. 6 is a diagram showing an example of a zoomed map displayed in a vicinity information display mode.
Figure 8:
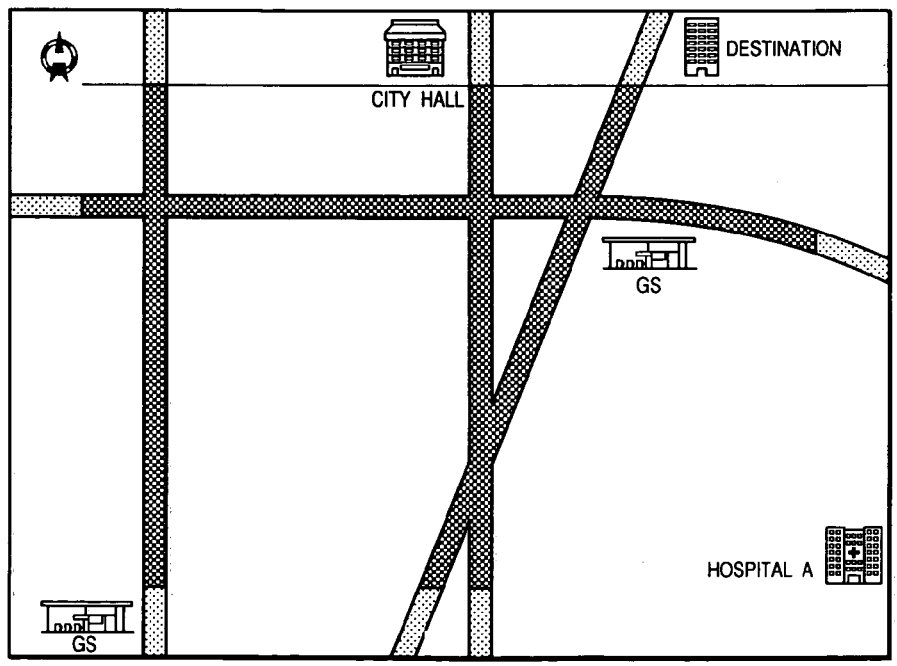
FIG. 8 is a diagram showing an example of a map displayed in the vicinity information display mode based on display of FIG. 4.

In the processes of steps S5 to S7, as shown in FIG. 6, only the point information (information relating to a facility) associated with the points included in the map of FIG. 5 and excluded from the area of the partial map may be arranged and displayed in the periphery of the partial map. Alternatively, as shown in FIG. 8, the periphery of the partial map may be displayed with a different density, on which the point information associated with the points included in the map of FIG. 5 and excluded from the partial map is superposed and displayed. Further, the point information arranged in the periphery of the partial map and the point information (information relating to a facility) associated with the points in the area of the partial map may be displayed in, for example, monochrome and color, respectively, for the purpose of distinction from each other.

The point information to be displayed in the periphery of the partial map is displayed (arranged) such that a direction of a straight line passing an arrangement position of each piece of the point information and the center of the map shown in FIG. 5 coincides with a direction of a straight line passing an arrangement position of each piece of the point information and the center of the map shown in FIG. 6.

As a result, the user can easily recognize which area is displayed in the current map. At this time, a distance between the point associated with the point information displayed in the periphery of the partial map and the center of the partial map may be displayed in proximity to the each piece of the point information.

Figure 9:
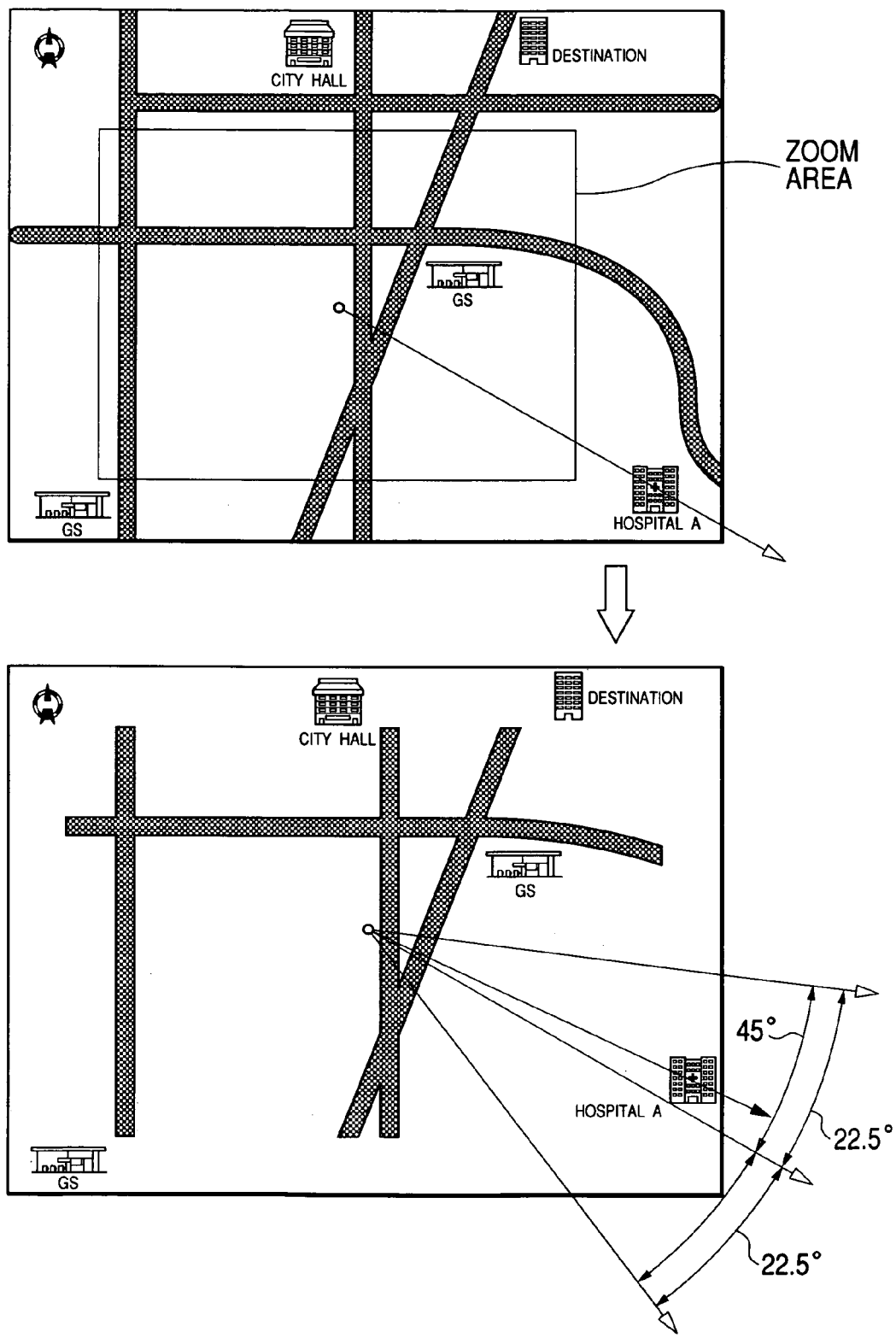
FIG. 9 is a diagram for explaining an allocation area of point information.

Alternatively, the direction of the straight line passing the arrangement position of each piece of the point information to be displayed in the periphery of the partial map and the center of the map shown in FIG. 5 does not necessarily coincide with the direction of the straight line passing the arrangement position of each piece of the point information and the center of the map shown in FIG. 6. Each piece of the point information to be displayed in the periphery of the partial map may be displayed (arranged) by being changed in position in FIG. 6 or 8 depending on a positional relationship with respect to another image such that the above two straight lines cross each other in the same plane at an angle of 22.5° or less (that is, within a range of ±22.5° of an actual direction of each of the point information). 22.5° is determined on grounds that in general, directions on a map are often represented by cardinal points (north, south, east, and west) and intercardinal points (northeast, southeast, southwest, and northwest) which are separated by 45°, and that as shown in FIG. 9, the point information is always arranged within a range of 45° with the above crossing angle of 22.5° or less, making it easy for the user to recognize the positional relationship.

The user previously can register in the flash memory 4 whether the normal display mode and the vicinity information display mode are used as a display mode to be executed at the start of the map display control program, or the user can select the modes at the start of the map display control program.

The normal display mode and the vicinity information display mode can be switched over during execution of the map display control program as follows. For example, in the case where the map of FIG. 6 is displayed on the screen in the vicinity information display mode, when the touch panel 71 is touched and the mode is switched over to the normal display mode, as shown in FIG. 7, the zoomed map is displayed over the entire screen. Thus, the point information displayed in the periphery of the partial map of FIG. 6 completely disappears from the screen. When the touch panel 71 is touched again, the normal display mode is switched over to the vicinity information display mode.

Note that the switching of the modes in step S4 may be performed such that the mode is switched over to the normal display mode when the map has a larger scale, and the mode is automatically switched over to the vicinity information display mode when the map has a smaller scale for zoom display.

In a process for extracting vicinity information of step S5 of FIG. 2 in the vicinity information display mode, the vicinity information is added with attributes (for example, a "railroad station", a "municipal name", and the like) of the point information indicating a destination and a facility displayed outside the partial map, and the display may be limited to a given attribute selected from the above attributes. Alternatively, selective display can be performed by designating the distance between the center (or a current point of electric equipment shown in a second embodiment described below) of the partial map and the point associated with the point information indicating the facility as, for example, "20 km", and by registering in the flash memory 4 display conditions under which, for example, only objects existing in the area are displayed.

Further, in the vicinity information display mode, the point information indicating the destination and the facility displayed outside the partial map may be changed in the size, the displaying color, or the displaying density of a picture of the point information depending on distances divided into, for example, 0 km or more and less than 10 km, 10 km or more and less than 20 km, and 20 km or more, so that the distances from the points associated with the information can be recognized on the map.

The display of the point information can of course be changed in a non-stepwise manner depending on the distances. Alternatively, the display can be changed depending on the scale (magnification) such that, for example, when the map has a scale of 1:100000, the display is changed in the size, the displaying color, or the displaying density of the picture of the point information depending on the distances divided into 0 km or more and less than 10 km, 10 km or more and less than 20 km, and 20 km or more, and when the map has a scale of 1:50000, the display is changed depending on the distances divided into 0 km or more and less than 5 km, 5 km or more and less than 10 km, and 10 km or more.

The above processes can be achieved by retaining data of the position in which a facility exists in the point information (information relating to the facility) and calculating the distance from the current point.

Further, every time the touch panel 71 is touched, the display may be alternately switched over between the display of the place name such as a municipal name and the display of the picture (icon) representing a facility such as a railroad station.

Further, in the vicinity information display mode, the display suitable for the user can be performed by previously registering the display conditions in a flash ROM as follows. That is, in the case where a plurality of objects to be displayed among the point information existing outside the zoomed partial map exist in the same direction, only the closest object is displayed; when the superposed point information is touched through the touch panel 71, an object to be displayed on top is switched over; and when priorities are assigned to the point information, only an object having a top priority is displayed.

Further, when the point information displayed in the periphery of the partial map is selected through the touch panel or the like, selection can be made between the display of a photograph of the point or character information such as a telephone number or a facility guidance and the display to be switched over to the map with the point information as its center. At the time of selecting the display to be switched over to the map with the point information as its center, the scale of the map after the switching can also be selected arbitrarily.

Further, when a map is displayed, a dragging operation may be performed through a cursor key (not shown) or the touch panel. Then, the map display area can be moved and the map is displayed again based on the set display mode. If the vicinity information display mode is set at that time, the display position of the point information to be displayed in the periphery of the partial map is recalculated to be rearranged. Also, when the display of the distance is selected, the distance from the center of the map is recalculated to be displayed again.

Further, the display position and the distance of the point information displayed in the periphery of the partial map may be determined based on not only a direction from the center of the map but also a position on the map which is arbitrarily selected as a reference by the user.

Second Embodiment

Figure 10:
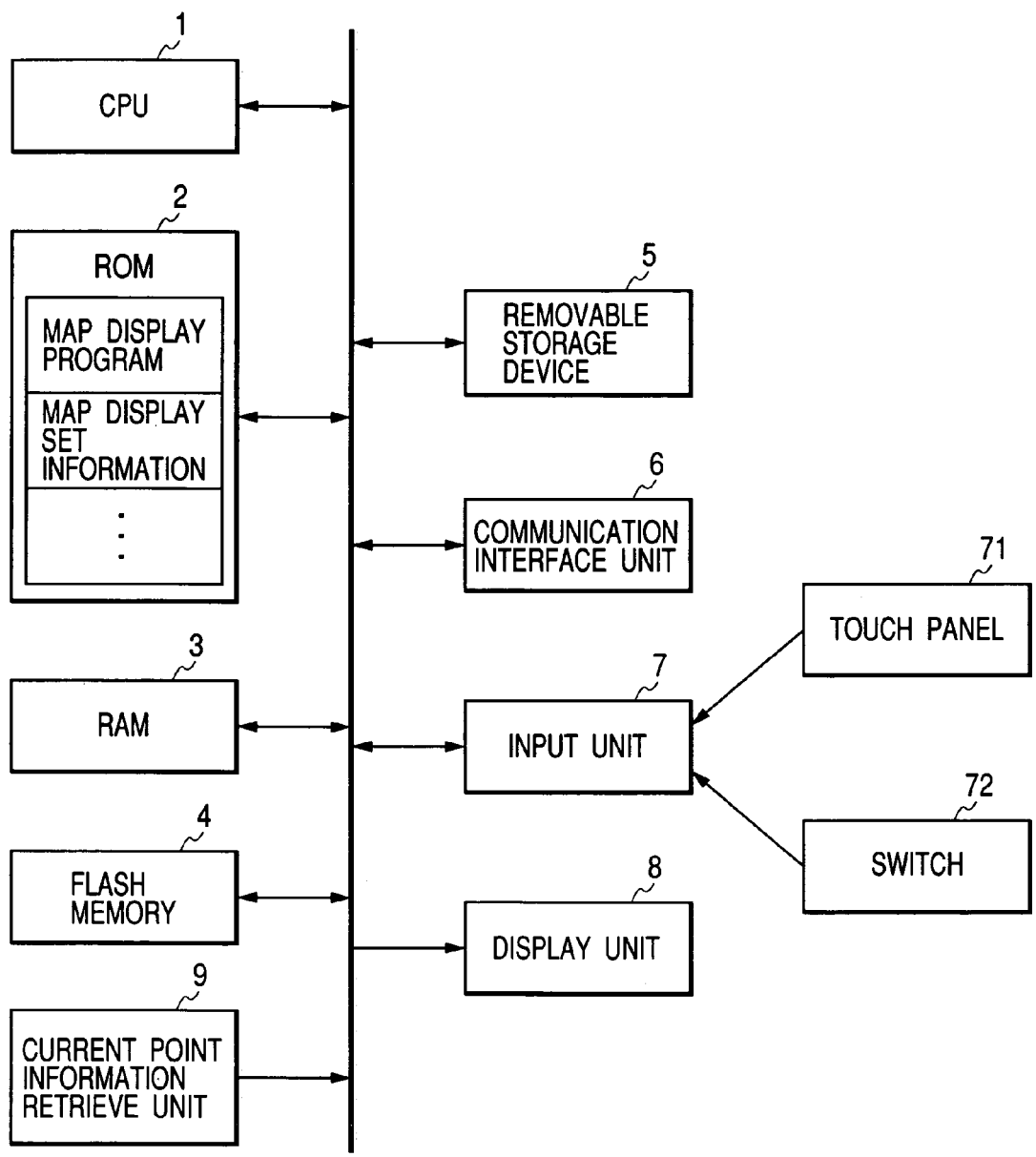
FIG. 10 is a block diagram showing electronic equipment according to a second embodiment of the present invention.

FIG. 10 is a block diagram showing electronic equipment according to the second embodiment.

In FIG. 10, a current point information retrieve unit 9 receives radio waves transmitted from a geodetic satellite of a global positioning system (hereinafter, referred to as "GPS") to retrieve a reception location, and the map display control program recognizes the reception location as the current point of the electronic equipment. Note that the current point information retrieve unit 9 may be combined with an autonomous navigation system using a gyro sensor, a magnetic field sensor, etc. to structure a system with higher accuracy. The other components shown in FIG. 10 are regarded as functioning similarly to the corresponding components shown in FIG. 1, and their description will be omitted hereinbelow.

Figure 11:
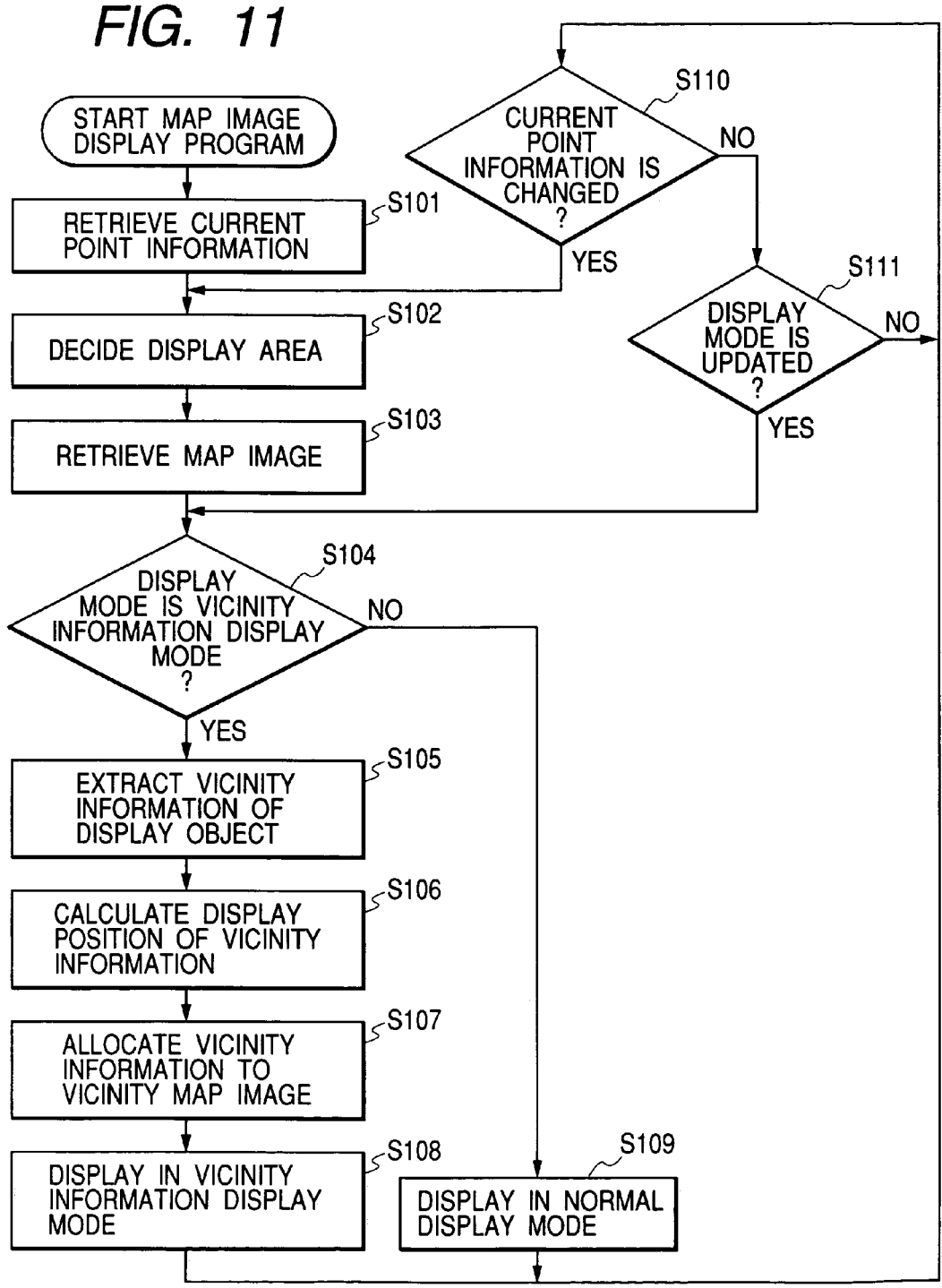
FIG. 11 is a flow chart showing an example of a map display control program that is stored in a ROM 2 of FIG. 10.

FIG. 11 is a flow chart showing an example of the map display control program that is stored in the ROM 2 of FIG. 10.

Referring to FIG. 11, upon start of execution of the map display control program, current point information is first retrieved through the current point information retrieve unit 9 (step S101). The CPU 1 determines a display area based on the retrieved current point information (step S102). In the case where the current point information retrieve unit 9 cannot retrieve the current point information such as the case where the radio waves from the GPS cannot be received, the display area is determined based on an arbitrary initial set location or the current point information that has last been retrieved.

Then, the map information database included in the removable storage device 5 is searched for data relating to the display area, and a map is retrieved therefrom in a scale based on the set information that is previously registered in the flash memory 4 (step S103).

It is next checked whether the display mode is set to the normal display mode or the vicinity information display mode (step S104). According to the designated display mode found in step S104, the map is expanded into the RAM 3 as the display data, and displayed on the screen of the display unit 8 based on the expanded display data. In addition, point information (an icon) associated with a point included in the map displayed on the screen of the display unit 8 is superposed on the map (steps S108 and S109). The point information includes an intersection name, a station name, a picture representing a facility such as a city hall, a police station, or a hospital, and a place name.

In the case where the vicinity information display mode is found to be designated in step S104, the process advances to step S105 to extract the vicinity information on the display object.

Figure 12:
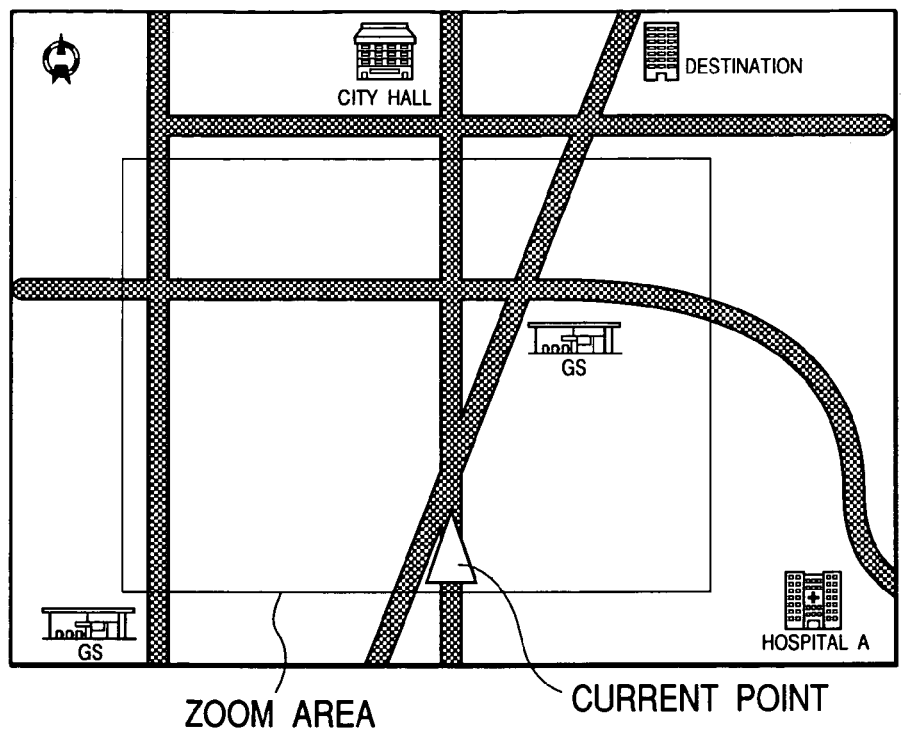
FIG. 12 is a diagram showing an example of a map displayed in a normal display mode.
Figure 13:
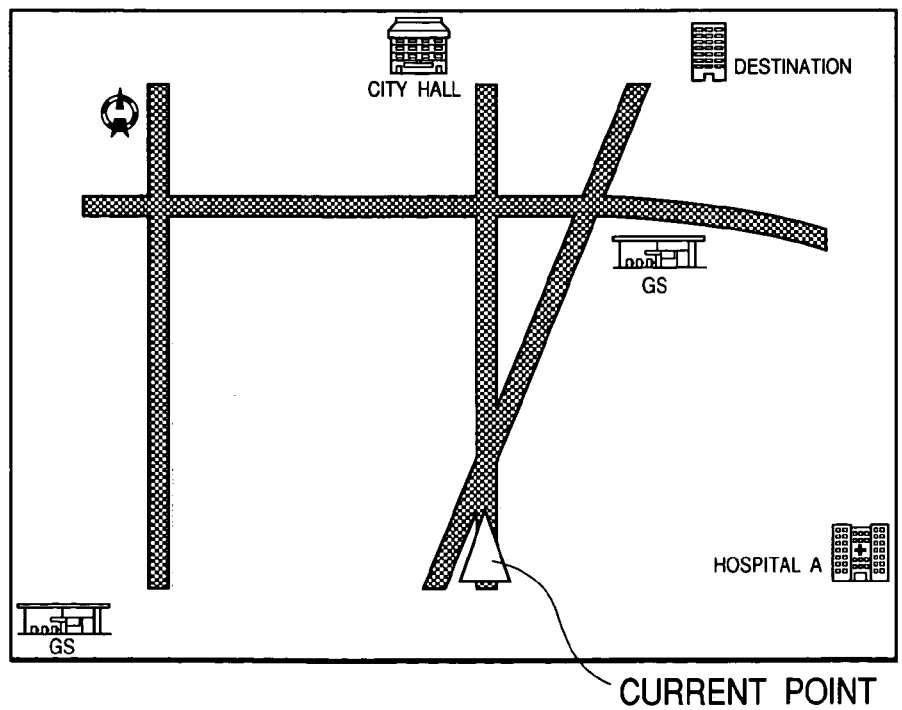
FIG. 13 is a diagram showing an example of a zoomed map displayed in a vicinity information display mode.
Figure 14:
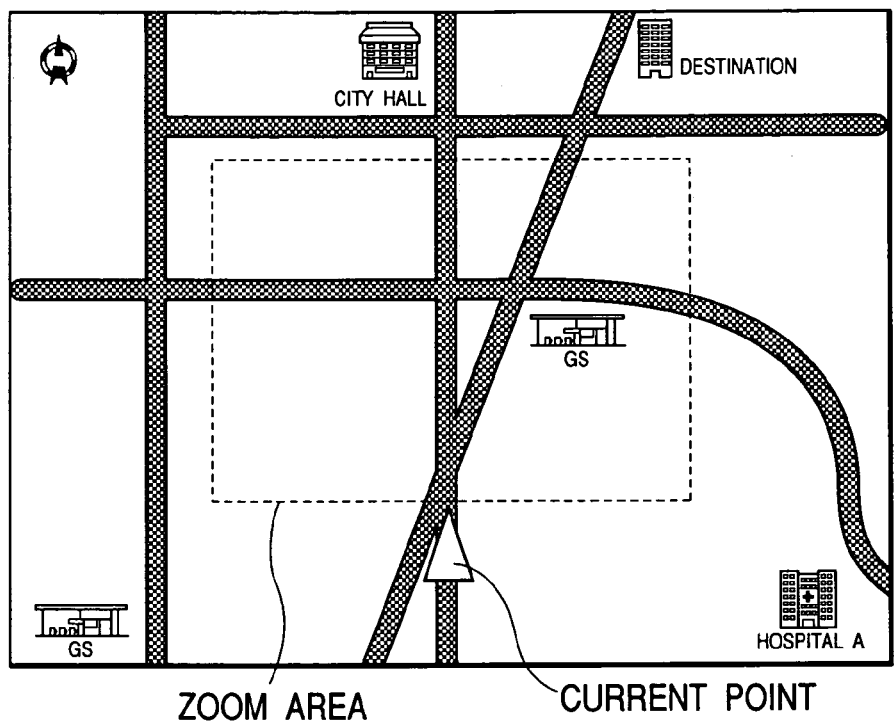
FIG. 14 is a diagram showing an example of a map displayed in the normal display mode.

In the case where the current point of the electronic equipment is included in the area of the partial map in step S106, the arrangement of the point information (facility information relating to a facility) to be displayed in the periphery of the partial map is calculated such that a direction of a straight line passing an arrangement position of each piece of the point information and the current point of the map shown in FIG. 12 coincides with a direction of a straight line passing an arrangement position of each piece of the point information and the current point of the map shown in FIG. 13. On the other hand, in the case where the current point is not included in the partial map, the position of the point information to be displayed in the periphery of the partial map is calculated such that a direction of a straight line passing a display position of each piece of the point information and the center of the map shown in FIG. 14 coincides with a direction of a straight line passing a display position of each piece of the point information and the center of the map shown in FIG. 15. Note that in the case where the current point becomes outside the display due to the change in the map, as shown in FIG. 15, the current point is displayed in the periphery of the partial map as the point information.

In step S107, the point information is arranged on the display screen based on the display position of the point information which is calculated in step S106.

In step S108, the map is displayed in the vicinity information display mode based on the point information arranged in step S107.

Figure 15:
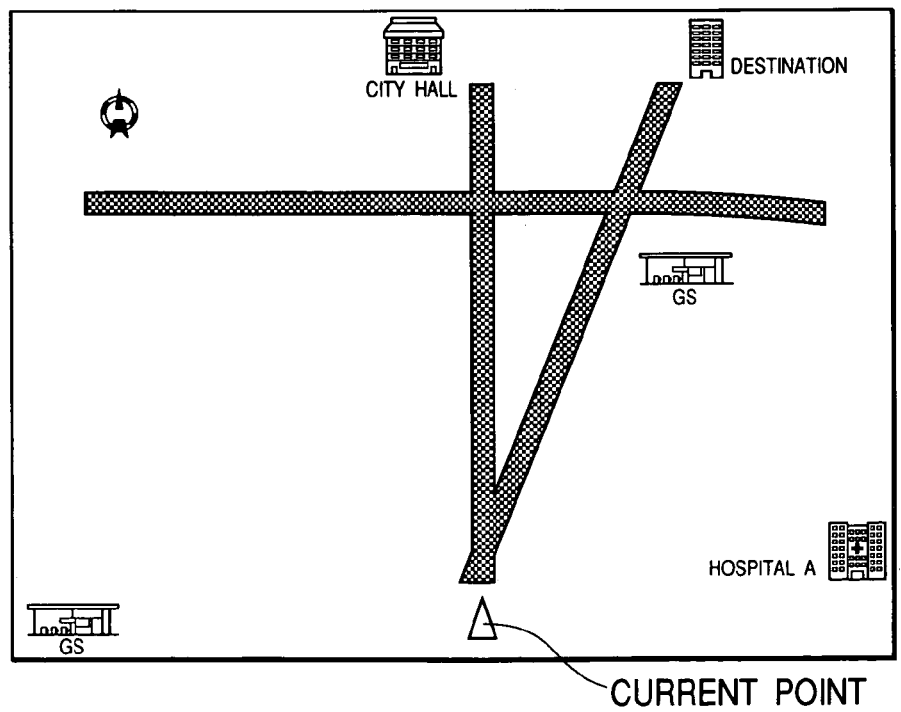
FIG. 15 is a diagram showing an example of a zoomed map displayed in the vicinity information display mode.

Note that in the case where the point information that has been arranged on the map is not displayed due to the smaller scale of the map (zoomed display of the map), as shown in FIG. 15, the partial map corresponding to the change in the display of the map is displayed within the screen of the display. At the same time, the point information associated with the point included in the map of FIG. 14, which is previously displayed, and excluded from the partial map is arranged and displayed.

That is, the display control enables the user to grasp the position of the point information that is previously displayed on the map, resulting in extreme user-friendliness. Here, in the case where the display scale of the map of FIG. 15 becomes smaller (the display of the map is zoomed), the display of the point information relating to the facility in the vicinity which is excluded from the partial map displayed in FIG. 15 may be canceled for preventing complicated display. In other words, in the case where the display of the map of FIG. 15 is further zoomed, only the picture of a gas station at the center and its name "GS" are displayed.

The above process can be achieved by retaining the point information that is currently displayed on the map in the RAM 3 and retrieving the retained point information when the display of the map is changed.

Further, the current point information of the electronic equipment is retrieved on a regular basis, and it is judged whether or not the information is updated (step S110). In the case where the current point information is updated, the process advances to step S102, where the display is similarly performed by determining the display area and retrieving a map corresponding to new current point information. On the other hand, in the case where the current point information is not updated, the process advances to step S111. In step S111, it is judged whether or not the display mode is changed. In the case where the display mode is changed, the process advances to step S104, and in the case where the display mode is not changed, the process advances to step S110.

As has been described above, according to the respective embodiments, the present invention produces the following effects.

(1) Depending on the area and the scale of the map to be displayed, the destination or the point in the vicinity becomes outside the map area and is not displayed on the map. Even in such a case, vicinity point information is displayed in the periphery of the map, and thus the user can view the vicinity point information together with a desired map even on a limited display screen.

(2) The vicinity point information is in a position coinciding with an accurate direction viewed from the center of the displayed map, so that the positional relationship between the point indicated by the vicinity point information and the center of the map can easily be grasped.

(3) In addition to the vicinity point information, the point indicated by the vicinity point information and the distance from the center of the map are displayed, so that the distance as well as the positional relationship can easily be grasped.

(4) The normal display mode and the vicinity information display mode can arbitrarily be switched over to each other. Therefore, the screen area used for displaying the vicinity information in the vicinity information display mode can be used as the map display area as well, so that the entire screen can be used for displaying the map.

(5) In the vicinity information display mode, the point information outside the display area and the point information within the display area can be distinguished from each other by having different colors and sizes, and the point information outside the display area is superposed on the map for display. Accordingly, the user can view the vicinity point information together with a desired map while using the entire screen for displaying the map.

In the respective embodiments, description has been made of the examples of the map display control program that is stored in the ROM 2, but there is no limitation thereto. The map display control program may be stored in a hard disk built into the electronic equipment, a memory, or a removable storage device, and upon its execution, may be stored in the RAM 3 so that the map display control program in the RAM 3 is executed. Alternatively, the map display control program may be stored in an external storage device connected to the communication interface unit 6, and upon its execution, may be stored in the RAM 3 so that the map display control program in the RAM 3 is executed.

What is claimed is:

1. A method of controlling display of a map, in which based on a designation of a map display area desired to be displayed on a display screen, a corresponding map and a position of a facility included in the map display area are displayed, the method comprising:

an identifier adding step for, in response to an instruction of zoom display of a map corresponding to a first area that is currently displayed, in order to distinguish point information associated with a first point existing in an area of a map corresponding to a second area to be zoomed from point information associated with a second point excluded from the second area to be zoomed in the map corresponding to the first area, adding to each piece of point information an identifier indicating whether or not a point is in a position in the second area; and a display step for displaying the map corresponding to the second area to be zoomed within the display screen, the point information associated with the first point in a position for indicating the first point included in the second area, and the point information associated with the second point excluded from the second area in a position for indicating a direction of the second point in a periphery of the map corresponding to the second area.

2. The method according to claim 1, wherein a process is executed for restraining display of the point information associated with a position existing a predetermined distance apart from a center of the map corresponding to the second area displayed in the display step.

3. The method according to claim 1, wherein when a current point of an electronic equipment for implementing the method exists on a zoomed map image displayed in the display step, a process is executed for restraining display of the point information associated with the second position existing a predetermined distance apart from the current point.

4. The method according to claim 1, wherein a display condition of the point information is changed depending on a distance from a center of the map corresponding to the second area displayed in the display step.

5. The method according to claim 1, wherein when a current point of an electronic equipment for implementing the method exists on a zoomed map image displayed in the display step, a display condition of the point information is changed depending on a distance between the current point and the second point.

6. The method according to claim 1, wherein in the display step, the periphery of the map corresponding to the second area on which the point information associated with the second point is superposed is set as an area different from another area of the map.

7. The method according to claim 1, wherein in the display step, the point information associated with the second point is displayed within a range of ±22.50° of an actual direction.

8. A computer-readable medium encoded with a computer program for implementing a method of controlling display of a map, in which based on a designation of a map display area desired to be displayed on a display screen, a corresponding map and a position of a facility included in the map display area are displayed, the computer program implementing a method comprising:

an identifier adding step for, in response to an instruction of zoom display of a map corresponding to a first area that is currently displayed, in order to distinguish point information associated with a first point existing in an area of a map corresponding to a second area to be zoomed from point information associated with a second point excluded from the second area to be zoomed in the map corresponding to the first area, adding to each piece of point information an identifier indicating whether or not a point is in a position in the second area; and a display step for displaying the map corresponding to the second area to be zoomed within the display screen, the point information associated with the first point in a position for indicating the first point included in the second area, and the point information associated with the second point excluded from the second area in a position for indicating a direction of the second point in a periphery of the map corresponding to the second area.

9. The computer-readable medium according to claim 8, wherein a process is executed for restraining display of the point information associated with a position existing a predetermined distance apart from a center of the map corresponding to the second area displayed in the display step.

10. The computer-readable medium according to claim 8, wherein when a current point of an electronic equipment for implementing the method exists on a zoomed map image displayed in the display step, a process is executed for restraining display of the point information associated with the second position existing a predetermined distance apart from the current point.

11. The computer-readable medium according to claim 8, wherein a display condition of the point information is changed depending on a distance from a center of the map corresponding to the second area displayed in the display step.

12. The computer-readable medium according to claim 8, wherein when a current point of an electronic equipment for implementing the method exists on a zoomed map image displayed in the display step, a display condition of the point information is changed depending on a distance between the current point and the second point.

13. The computer-readable medium according to claim 8, wherein in the display step, the periphery of the map corresponding to the second area on which the point information associated with the second point is superposed is set as an area different from another area of the map.

14. The computer-readable medium according to claim 8, wherein in the display step, the point information associated with the second point is displayed within a range of ±22.5 degrees of an actual direction.

* * * * *

UNITED STATES PATENT AND TRADEMARK OFFICE
CERTIFICATE OF CORRECTION

PATENT NO. : 7,359,798 B2
APPLICATION NO. : 10/776167
DATED : April 15, 2008
INVENTOR(S) : Yoshinobu Nagamasa It is certified that error appears in the above-identified patent and that said Letters Patent is hereby corrected as shown below:

Title Page
After "Prior Publication Data" item 65:

Insert the following:

Title page, item --(30) Foreign Application Priority Data should read as follows:

Feb. 18, 2003 (JP) ............................... 2003-040048
Jan. 8, 2004 (JP) ............................... 2004-002991--.

Title Page,
Item [56] REFERENCES CITED:

FOREIGN PATENT DOCUMENTS,
"JP 11065430 A * 3/1996 should read --JP 11-065430 A * 3/1999
JP 2004272217 A * 9/2004        JP 2004-272217 A * 9/2004
JP 2005277705 A * 10/2005"      JP 2005-277704 A * 10/2005--

OTHER DOCUMENTS
"experienceLei" should read --experience. Lei--.

COLUMN 1:

Line 34, "are" should read --that are--.

UNITED STATES PATENT AND TRADEMARK OFFICE
CERTIFICATE OF CORRECTION

PATENT NO. : 7,359,798 B2
APPLICATION NO. : 10/776167
DATED : April 15, 2008
INVENTOR(S) : Yoshinobu Nagamasa It is certified that error appears in the above-identified patent and that said Letters Patent is hereby corrected as shown below:

COLUMN 9:

Line 58, "±22.50°" should read --±22.5°--.

Signed and Sealed this

Twelfth Day of August, 2008

JON W. DUDAS
*Director of the United States Patent and Trademark Office*